Figure 1:
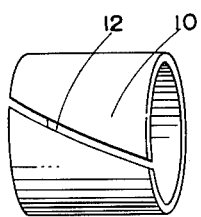

Oct. 2, 1962    E. S. SHANLEY ETAL    3,056,637
BEARING
Filed March 2, 1959

Edward S. Shanley
Donald B. Rising
INVENTORS

BY
Attorney

United States Patent Office 3,056,637
Patented Oct. 2, 1962

---

3,056,637
BEARING
Edward S. Shanley, Winchester, and Donald B. Rising, Needham, Mass., assignors, by mesne assignments, to Garlock Inc., Palmyra, N.Y., a corporation of New York
Filed Mar. 2, 1959, Ser. No. 796,386
5 Claims. (Cl. 308—238)

This invention relates to a novel and improved type of bearing which is truly a floating bearing.

Although so-called floating bearings are known (such as floating aluminum bearings) there is always some question whether or not they actually float in that the motion is not really shared between the two surfaces of the floating insert. Sliding is expected to start at only one of the bearing surfaces at the breakaway motion. Motion is apt to continue at that surface since the coefficient of dynamic friction is generally lower than that of static friction. The stationary surface of such a bearing thus tends to remain stationary and the bearing is actually not a floating one.

The attainment of a truly floating bearing is highly desirable in that such a bearing achieves the distribution of wear over all the surfaces involved. This is particularly important where corrosion resistance is a problem in bearing design. The distribution of wear moreover eliminates hollow spots in the shaft and housing surfaces and this means that the shearing forces are shared substantially equally among such surfaces.

In the conventional non-floating bearing insert all frictional heat is generated on one surface and the bearing temperature may be quite high. In contrast to this, if a bearing is truly a floating bearing and moves with respect to both surfaces, essentially equal frictional heat is generated on both sides of the bearing. Since heat may leave the bearing by way of both shaft and housing, there is only a small amount of heat transferred through the bearing. Ideally, of course, there should be no heat transferred across the bearing. Achievement of near ideal operation would mean that truly floating bearings would run at appreciably lower temperatures than fixed inserts. Since a polymeric material, such as polytetrafluoroethylene, has properties which make it especially desirable for bearing use, but is a relatively poor heat conductor, the minimizing of heat transfer across the bearing itself is very important.

Finally, since sliding speed is often a limiting factor in bearing performance, it would be highly desirable to provide a bearing wherein sliding speed is only one-half the total at each bearing surface.

It is therefore an object of this invention to provide a floating bearing which actually floats or moves over the entire range of speeds, i.e., from start up to the highest shaft speeds attained. It is another object of this invention to provide a bearing which is capable of distributing wear substantially equally among several surfaces and which thus minimizes wear and the formation of hollow spots. A further object is to provide a bearing which is superior to present bearings in applications where corrosion resistance is a problem. Yet another object is to provide a bearing through which there is a minimum quantity of heat transferred and which therefore operates at relatively low temperatures. A further object of this invention is to provide a bearing or insert which functions in such a manner that the sliding speed is reduced to about one-half the total sliding speed at each surface. These and other objects will be apparent in the following discussion.

Figure 2:
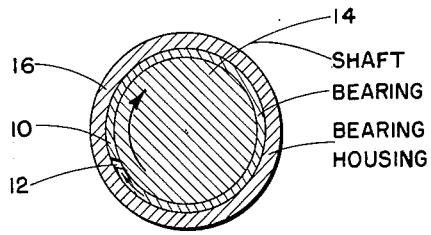
Figure 3:
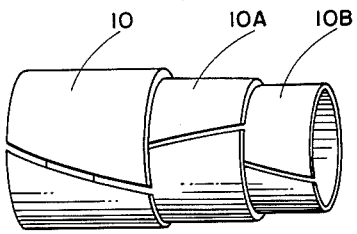
Figure 4:
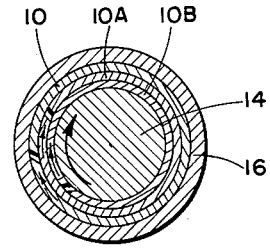
Figure 5:
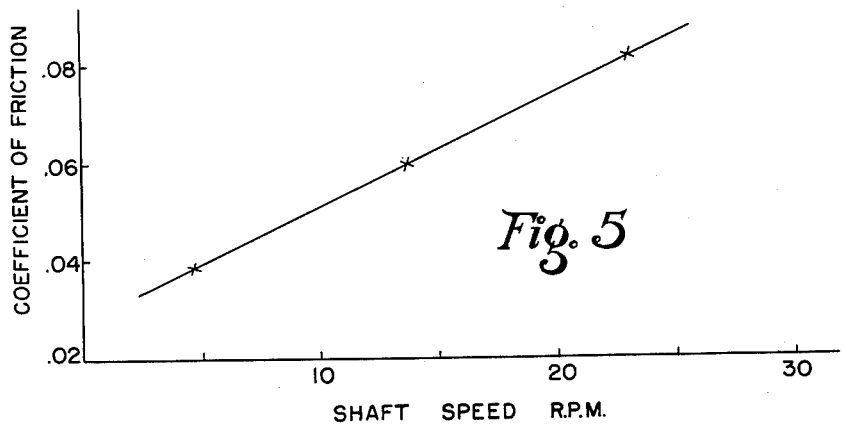

The floating bearing of this invention will be further described and discussed with reference to the accompanying drawings in which:

FIG. 1 represents one embodiment of the bearing of this invention;
FIG. 2 is a cross-section of a housing, a shaft and a bearing such as illustrated in FIG. 1;
FIG. 3 is another embodiment of the bearing of this invention;
FIG. 4 is a cross-section illustrating the application of the bearing of FIG. 3; and
FIG. 5 is a plot illustrating the relationship between the coefficient of friction of polytetrafluoroethylene and shaft speed.

By the process of this invention the wear encountered in the rotation of a shaft in a support is minimized by interposing between the surfaces of the shaft and the support an annular shaped interliner of polytetrafluoroethylene whereby said interliner rotates freely with respect to the surfaces distributing the thermal and frictional wear substantially equally between the surfaces.

The bearing which is adapted to line an annular space of a bearing housing and to have a shaft mounted therein comprises an annular liner of polytetrafluoroethylene, the annular liner being provided with a diagonal slot extending from end to end and being of a width circumferentially at least as great as the circumferential expansion of the polytetrafluoroethylene under operating conditions, said annular liner rotating freely with respect both to said bearing housing and to said shaft whereby the bearing motion is shared between said housing and said shaft. If the sleeve bearing is to be used under conditions where circumferential contraction instead of expansion will occur, the liner will not of course be provided with a slot.

A modification of the bearing of this invention embodies the use of a plurality of such annular shaped liners nested together. In this embodiment each of the interliners, i.e., floating bearings, rotates freely and hence provides for a further distribution of wear thus imparting a much longer life to the shaft and its housing.

Sleeve bearings formed of polytetrafluoroethylene are uniquely suitable for floating bearing inserts because of the unusual frictional characteristics of this material. The use of polytetrafluoroethylene in place of other materials in the formation of a floating sleeve bearing is not equivalent to the substitution of this material for any other material previously used since the employment of polytetrafluoroethylene results in greatly improved and unexpected performance.

Contrary to the behavior of other floating sleeve bearings, those constructed in accordance with this invention from polytetrafluoroethylene always share the bearing motion between two surfaces. A number of inserts formulated in accordance with this invention were made and tested. Contrary to the behavior of other so-called floating bearings, the inserts of this invention invariably shared the motion of the shaft between the shaft and housing surfaces. Although we are not able to give a complete explanation for this unexpected behavior, we believe it is related to the fact that polytetrafluoroethylene exhibits a lower coefficient of friction as the relative motion approaches zero. This is illustrated in FIG. 5 wherein coefficient of friction of polytetrafluoroethylene is plotted against shaft speed.

Although we do not wish to be bound by the theory we offer for the performance of the bearing of this invention, we suggest that because of the very low coefficient of friction exhibited by polytetrafluoroethylene at very low shaft speeds, in the bearing of this invention sliding starts at both of the bearing surfaces as the shaft beings to rotate, i.e., at the breakaway motion. This in turn means there can be no tendency for a stationary surface of the bearing to remain stationary, since motion with respect to both surfaces was effected almost immediately.

The equal sharing of bearing motion by the floating bearing of this invention is obtained under many and varied conditions. For example, no efforts need be made to match the smoothness or other characteristics of the metal surfaces on the two sides of the bearing. In fact, bearing rotation is invariably achieved even when the materials on the two sides of the bearing are different in frictional properties. For example, the polytetrafluoroethylene floating sleeve bearing of this invention rotated when the holder was aluminum and the shaft was steel. This also occurred when the holder of plain steel in the "as machined" condition and the shaft was polished stainless steel.

Floating sleeve construction is especially well adapted to the physical properties of polytetrafluoroethylene bearings. We observed a marked tendency for material transfer in cases where we tried to restrain the tape, i.e., sleeve bearing. If put in compression, the tape got shorter and thicker. If held in tension, the tape elongated and thinned down. These troubles, caused by limited flow resistance of the polytetrafluoroethylene are almost completely circumvented when the tape is allowed to rotate. This mode of operation puts minimum tensile or lengthwise compressional loading on the material. In addition, wear is uniformly spread over the whole circumference of a floating bearing. Heat transfer is facilitated because a part of the heat is generated on either side of a floating insert. As a consequence, less heat must flow through the poorly conducting plastic; the net result being lower bearing temperature.

In FIGS. 1–4 there are illustrated two modifications of the bearing of this invention and their use in a typical bearing application. In FIG. 1 a polytetrafluoroethylene tape (most usually made by skiving the tape from a molded cylindrical shape) is formed into an annular ring 10 having a diagonal slot 12 extending from end to end. Tapes formed by techniques other than skiving are also, of course, suitable. For example suitable bearings may be made by extruding, calendering, molding and other processes. This is a preferable design and the width of the slot should be at least as great as the circumferential expansion of the polytetrafluoroethylene under the maximum temperatures obtaining in the bearing's use. The bearing itself is very thin in relation to its circumference. Since the bearings of this invention may be used at low temperatures (e.g., below room temperature) contraction of the tape may be encountered. In such cases the slot would be eliminated and this invention contemplates bearings without slots.

The bearing of FIG. 1 is shown in a typical application in FIG. 2. In this figure shaft 14 rotates as indicated in a housing 16 and the polytetrafluoroethylene sleeve bearing 10 is located between the surfaces of the shaft and the housing. This sleeve bearing rotates in the same direction as the shaft at a speed equivalent to about one-half that of the shaft speed. Thus in rotating, with respect to both the shaft and the bearing housing surface, at a speed equivalent to about one-half of the shaft speed the bearing distributes the wear between these two surfaces.

In FIG. 3 there is shown another modification of the floating sleeve bearing of this invention. In this modification there are provided three thin annular shaped interliners, 10, 10a and 10b, which are nested and which fit snugly in this arrangement. Each of these may have diagonal slots extending from end to end as in the case of the single sleeve bearing of FIG. 1. As in the case of the single bearing, these also are formed of extremely thin tape, tape which may be thinner than that of the bearing of FIG. 1 because of the distribution of the heat generated in the bearing operation. It will be appreciated that the modification of FIG. 3 is not limited to three concentric sleeve bearings, but that the number may be any convenient number.

FIG. 4 illustrates the employment of the multiple bearing arrangement of FIG. 3 in a typical shaft and housing arrangement. As in the case of the use of the bearing in FIG. 2, it will be seen that the three concentric rings forming the bearing of FIG. 4 all rotate in the direction of the shaft, but in this case each one rotates at a fraction of the speed of the shaft. This in turn reduces the wear on the surfaces of the housing and the shaft below that which would be experienced if the bearing were not truly a floating bearing.

The polytetrafluoroethylene which is used to form the floating bearing of this invention may be unfilled, filled or filled and etched. Suitable fillers for the polytetrafluoroethylene include but are not limited to glass fibers, copper, bronze, carbon and graphite, molybdenum sulfide, lead, glass, talc, asbestos, silica, coke flour, calcium fluoride and other finely comminuted solids which are compatible with the polytetrafluoroethylene. Usually such fillers may be present in amounts ranging up to about 60 percent by volume of the polytetrafluoroethylene - filler composition. Compositions containing from about 10 to 40 percent by volume are mostly commonly used. The polytetrafluoroethylene and the filled polytetrafluoroethylene material is prepared by any method known in the art.

In a co-pending application filed in the names of Donald B. Rising and Edward S. Shanley on December 22, 1958, and bearing Serial No. 781,828, there is disclosed a process by which a filled polytetrafluoroethylene may be etched on the surface to give the material certain desirable characteristics. In etching, a minor amount of the filler is removed from the surface. Polytetrafluoroethylene prepared in the manner described in that application is also particularly well suited for the bearings of this invention.

This invention may be further illustrated in the following example which is not meant to be limiting.

EXAMPLE I

Tape of 0.020-inch thickness formed of a glass-filled polytetrafluoroethylene (approximately 20% glass fibers by volume) was cut and formed into sleeve bearings one inch wide and suitable for insertion in a bearing housing in which a one-inch diameter shaft was run. In a series of runs the polytetrafluoroethylene insert was alternately permitted to rotate and forced to remain in place. The data obtained are tabulated below.

*Polytetrafluoroethylene Tape Inserts, One Inch, Running Against a One-Inch Diameter Shaft*

| Bearing Load, PV [1] | Polytetrafluoroethylene Insert free to rotate | | Polytetrafluoroethylene Insert held in place | |
|---|---|---|---|---|
| | Max. Temp., °F. | Max. Coef. of Friction | Max. Temp., °F. | Max. Coef. of Friction |
| 10,600 | 250 | 0.18 | | |
| 10,500 | 250 | 0.16 | | |
| 9,000 | | | 550 | 0.60 |
| 7,000 | | | 450 | 0.45 |
| 9,860 | 280 | 0.26 | | |

[1] PV = Product of bearing load in lbs./in.$^2$ of projected area × sliding velocity in ft./min.

The difference in bearing endurance was very striking in the two cases. Where the bearing was confined it did not last more than a few hours, e.g., no more than five. In contrast those bearings which were permitted to rotate freely were in excellent condition after 100 hours of nonstop operation The decrease in coefficient of friction for the bearings of this invention is very substantial. This decrease is apparently a function of the marked decrease in temperature and of the lower sliding speeds at each surface.

Bearings constructed in accordance with this invention are truly floating bearings and hence are capable of achieving all of the advantages discussed above which are inherent in a floating bearing. This means that wear of surfaces is distributed substantially equally among the surfaces and that hollow spots normally developed are eliminated. By this sharing of motion heat transfer is facilitated and occurs on either side of the floating bearing. This means that even though polytetrafluoroethylene is a poor heat conductor it is capable of standing up under drastic conditions and can operate at lower bearing temperatures. Furthermore, the known advantages of lower sliding speed are attained and tensile stresses in the polytetrafluoroethylene resin are minimized or eliminated by the floating construction.

We claim:

1. In combination, a bearing housing, a shaft mounted therein and defining an annular space therebetween, and a bearing adapted to line said annular space, said bearing comprising a plurality of nested annular-shaped liners of a material, the major volumetric portion of which is polytetrafluoroethylene, each of said annular liners being provided with a diagonal slot extending from end to end and being of a width at least as great as the circumferential expansion of said polytetrafluoroethylene under operating conditions, said annular liners rotating freely with respect to each other, to said bearing housing and to said shaft, whereby the bearing motion is shared substantially equally among said liners, said housing and said shaft.

2. Bearing in accordance with claim 1 wherein the material of at least one of said annular-shaped interliners is polytetrafluoroethylene containing a filler present in a quantity ranging up to about 40 percent by volume.

3. Bearing in accordance with claim 2 wherein said filler is glass fibers.

4. Bearing in accordance with claim 2 wherein said filler is carbon.

5. Bearing in accordance with claim 2 wherein the surface of said material is etched whereby a minor portion of said filler is removed from said surface.

References Cited in the file of this patent

UNITED STATES PATENTS

| | | |
|---|---|---|
| Re. 15,058 | Heina | Mar. 8, 1921 |
| 2,004,708 | Pfanstiehl | June 11, 1935 |
| 2,400,091 | Alfthan | May 14, 1946 |
| 2,400,099 | Brubaker et al. | May 14, 1946 |
| 2,675,283 | Thomson | Apr. 13, 1954 |
| 2,695,425 | Stott | Nov. 30, 1954 |
| 2,835,540 | Jorgensen | May 20, 1958 |
| 2,851,316 | Thomson | Sept. 9, 1958 |

FOREIGN PATENTS

| | | |
|---|---|---|
| 5,304 | Great Britain | 1885 |
| 730,655 | Great Britain | May 25, 1955 |
| 795,242 | Great Britain | May 21, 1958 |
| 799,480 | Great Britain | Aug. 6, 1958 |

OTHER REFERENCES

Product Engineering, November 1952, page 224.

"Friction of Polytetrafluorethylene Dry Bearings," by Twiss et al., pp. 255–261 of June 1958 Lubricating Engineering.